United States Patent

Hazama et al.

[11] 4,064,196
[45] Dec. 20, 1977

[54] FLAME-RETARDANT RESIN COMPOSITIONS

[75] Inventors: Kenichi Hazama, Joyo; Isamu Hirose; Kenji Yasue, both of Kyoto; Daisuke Shinoura, Takatsuku all of Japan

[73] Assignee: Unitika Ltd., Amagasaki, Japan

[21] Appl. No.: 659,190

[22] Filed: Feb. 19, 1976

[30] Foreign Application Priority Data

Feb. 19, 1975 Japan .................... 50-20749

[51] Int. Cl.² .................. C08L 67/02; C08L 67/08
[52] U.S. Cl. .................. 260/860; 106/15 FP; 260/40 R; 260/45.85 P; 260/DIG. 24
[58] Field of Search ............ 260/40 R, DIG. 24, 860, 260/47 R, 45.85; 106/15 FP

[56] References Cited

U.S. PATENT DOCUMENTS

| 3,395,119 | 7/1968 | Blaschke et al. | 260/47 |
| 3,855,277 | 12/1974 | Fox | 260/45.7 R |
| 3,953,394 | 4/1976 | Fox et al. | 260/860 X |

OTHER PUBLICATIONS

Conix in Ind. & Eng. Chem. 51 No. 2, 147 (1959).

*Primary Examiner*—Thomas De Benedictis
*Attorney, Agent, or Firm*—Sughrue, Rothwell, Mion, Zinn and Macpeak

[57] ABSTRACT

A resin composition comprising: (a) an aromatic co-polyester comprising terephthalic acid, isophthalic acid and a halogen-free bisphenol; and (b) a halogen-containing aromatic co-polyester containing terephthalic acid, isophthalic acid and, at least in part, a bisphenol bearing a halogen substituent(s) as a comonomer. Molded articles prepared from such a resin composition possess excellent mechanical properties, electrical properties and flame-retardant capabilities.

11 Claims, No Drawings

FLAME-RETARDANT RESIN COMPOSITIONS

BACKGROUND OF THE INVENTION

1. Field of the Invention

The present invention relates to a flame-retardant aromatic co-polyester composition. More particularly, it is concerned with a flame-retardant aromatic co-polyester composition comprising a halogen-free aromatic co-polyester and a halogen-containing aromatic co-polyester.

2. Description of the Prior Art

Aromatic co-polyesters comprising isophthalic acid, terephthalic acid and 2,2-bis(4'-hydroxyphenyl) propane are well known. It is also known that such aromatic co-polyesters possess excellent mechanical and electrical properties and have excellent heat resistance and solvent resistance.

Such aromatic co-polyesters are mainly used in the mechanical field and in the electrical field due to their excellent mechanical and electrical properties, excellent heat resistance, and solvent resistance. However, their flame-retardant capabilities are not completely satisfactory.

It is also known to incorporate a phosphorus-containing compound, a halogen-containing compound, a metal compound, or the like in aromatic co-polyesters in order to render them flame-retardant. However, these compounds have poor heat stability at elevated temperatures and, when subjected to melt-molding (for example, extruding to obtain pellets) or injection molding, they undergo decomposition and deteriorate the inherent properties of the aromatic co-polyesters themselves.

Halogen-containing aromatic co-polyesters comprising isophthalic acid, terephthalic aicd and 2,2-bis(4'-hydroxy-3',5'-dibromophenyl)propane and/or 2,2-bis(4'-hydroxy-3',5'-dichlorophenyl)propane are also well known. Such halogen-containing aromatic co-polyesters have excellent electrical properties, heat stability, solvent resistance and, in particular, excellent flame-retardant capabilities. However, with bisphenols where the position ortho to the hydroxy group is substituted by a halogen, polymers of excellent mechanical properties are difficult to obtain due to the comparative difficulty in obtaining high molecular weight polymers.

Halogen-conaining aromatic co-polyesters comprising isophthalic acid, terephthalic acid and 2,2-bis(4'-hydroxyphenyl)propane and 2,2-bis(4'-hydroxy-3',5'-dibromophenyl)propane and/or 2,2-bis(4'-hydroxy-3',5'-dichlorophenyl)propane are also known due to their excellent electrical properties, heat stability and solvent resistance. Above all, such materials exhibit excellent flame-retardant capabilities. However, high molecular weight copolymers are difficult to obtain when the proportion of 2,2-bis(4'-hydroxy-3',5'-dibromophenyl)propane and/or 2,2-bis(4'-hydroxy-3',5'-dichlorophenyl)propane to total bisphenols is increased. Thus, the mechanical properties of resulting copolymers are poor.

As a result of extensive research on processes to impart flame-retardant capabilities to the aforesaid halogen-free aromatic co-polyesters without deteriorating the excellent mechanical and electrical properties thereof, the inventors achieved the present invention.

SUMMARY OF THE INVENTION

The inventors have discovered that a mixture of the aforesaid halogen-containing aromatic co-polyester having excellent flame-retardant capabilities and excellent heat stability and the aforesaid halogen-free aromatic co-polyester exhibits improved flame-retardant capabilities without deteriorating the mechanical and electrical properties of the halogen-free aromatic co-polyester.

That is, the present invention provides a flame-retardant aromatic co-polyester composition comprising:

A. one or more halogen-free aromatic co-polyesters obtained by the condensation reaction of:
  a. 2,2-bis(4'-hydroxyphenyl)propane; and
  b. a mixture of isophthalic acid and/or its functional derivatives and terephthalic acid and/or its functional derivatives; and B. one or more halogen-containing aromatic co-polyesters obtained by the condensation reaction of:
  a. 2,2-bis(4'-hydroxy-3',5'-dibromophenyl)propane and/or 2,2-bis(4'-hydroxy-3',5'-dichlorophenyl)propane; and
  b. a mixture of isophthalic acid and/or its functional derivatives and terephthalic acid and/or its functional derivatives.

The term "functional derivatives" used above and hereinafter for isophthalic and terephthalic acids as reactants (b) refers to those having a function similar to that of the above acids and includes, for example, acid chlorides, acid bromides, phenyl esters, alkyl esters such as methyl ester, ethyl ester, t-butyl ester and the like.

It was quite surprising that the composition of the present invention possessed excellent mechanical properties, electrical properties, flame-retardant capabilities and solvent resistance in spite of the general knowledge that mixtures of two different polymers maintain the properties of the individual polymers only with difficulty. This aspect of the present invention may be attributed to the excellent miscibility of the two copolymers.

DETAILED DESCRIPTION OF PREFERRED EMBODIMENTS

The halogen-free aromatic co-polyester used in the present invention is obtained from 2,2-bis(4'-hydroxyphenyl)propane and a mixture of isophthalic acid and/or its functional derivatives and terephthalic acid and/or its functional derivatives.

As the acid component which is reacted with the bisphenols, i.e., 2,2-bis(4'-hydroxyphenyl)propane and/or 2,2-bis(4'-hydroxy-3',5'-dibromophenyl)propane and/or 2,2-bis(4'-hydroxy-3',5'-dichlorophenyl)propane, to prepare the aromatic co-polyesters of this invention, a mixture of from about 90 to about 10 mol% of terephthalic acid and/or its functional derivatives and from about 10 to about 90 mol% of isophthalic acid and/or its functional derivatives is used. More preferably, a mixture of from 30 to 70 mol% of terephthalic acid and/or its functonal derivatives and from 70 to 30 mol% of isophthalic acie and/or its functional derivatives is employed. Aromatic co-polyesters prepared from such bisphenols and a mixture of about 50 mol% of terephthalic acid and/or its functional derivatives and about 50 mol% of isophthalic acid and/or its functional derivatives, better yet a 50 : 50 mol% mixture, are most preferred.

The halogen-containing aromatic co-polyesters used in the present invention are copolymers comprising 2,2-bis(4'-hydroxy-3',5'-dibromophenyl)propane and/or 2,2-bis(4'-hydroxy-3',5'-dichlorophenyl)propane and a mixture of isophthalic acid and/or its functional derivatives and terephthalic acid and/or its functional derivatives, or copolymers comprising a mixture of 2,2-bis(4'-hydroxyphenyl)propane and 2,2-bis(4'-hydroxy-3',5'-dibromophenyl)propane and/or 2,2-bis(4'-hydroxy-3',5'-dichlorophenyl)propane and a mixture of isophthalic acid and/or its functional derivatives and terephthalic acid and/or its functional derivatives.

As the acid component which is reacted with the bisphenols to prepare the halogen-containing aromatic co-polyesters of this invention, a mixture of from about 90 to about 10 mol% of terephthalic acid and/or its functional derivatives and from about 10 to about 90 mol% of isophthalic acid and/or its functional derivatives is used. More preferably, a mixture of from 30 to 70 mol% of terephthalic acid and/or its functional derivatives and from 70 to 30 mol% of isophthalic acid and/or its functional derivatives is employed. Aromatic co-polyesters prepared from the bisphenols and a mixture of about 50 mol% of terephthalic acid and/or its functional derivatives and about 50 mol% of isophthalic acid and/or its functional derivatives, better yet a 50 : 50 mol% mixture, are most preferred.

The aromatic co-polyesters of this invention can be prepared by several methods. For example, an interfacial polycondensation process can be used. In this case an aqueous alkaline solution of one or more bisphenols and a terephthaloyl dihalide-isophthaloyl dihalide mixture dissolved in an organic solvent which is immiscible with water are mixed and reacted. Suitable interfacial polycondensation processes which can be used are disclosed, for example, in W. M. Eareckson, *J. Polymer Sci.*, XL 399 (1959) and in Japanese Patent Publication 1959/65.

The following is a typical polycondensation. An aqueous alkali solution of a bisphenol is added to a terephthaloyl dihalide-isophthaloyl dihalide mixture, more preferably a terephthaloyl dichloride-isophthaloyl dichloride mixture dissolved in an organic solvent, or an organic solvent solution of a terephthaloyl dihalide-isophthaloyl dihalide mixture is added to an aqueous alkaline solution of a bisphenol. Alternatively, an aqueous alkaline solution of a bisphenol and an organic solvent solution of a terephthaloyl dihalide-isophthaloyl dihalide mixture can be simultaneously added to a reaction vessel. Interfacial polycondensation takes place near the interface of the aqueous phase and the organic phase. However, since the aqueous phase and the organic phase are essentially immiscible, it is necessary to mutually disperse the phases. For this purpose an agitator or a mixer such as Homo-mixer can be used.

The concentration of the terephthaloyl dihalide-isophthaloyl dihalide mixture dissolved in the organic solvent is usually from about 2 to about 25% by weight, more preferably from 3 to 15% by weight, based on the weight of the solution. The concentration of the bisphenol in the aqueous alkaline solution is also usually from about 2 to about 25% by weight, more preferably from 3 to 15% by weight, based on the weight of the solution.

The amount of the bisphenol and of the terephthaloyl dihalide-isophthaloyl dihalide mixture used (molar ratio) is preferably maintained equivalent. An excess of the terphthaloyl dihalide-isophthaloyl dihalide mixture is not desirable in the preparation of a high molecular weight aromatic co-polyester having a logarithmic viscosity number greater than 0.50 as determined at a concentration of 1 g/100 ml in a solvent system of phenol-tetrachloroethane (6 : 4 by weight) at 25° C.

Preferred alkalis are sodium hydroxide and potassium hydroxide. The concentration of the alkali in the aqueous solution can vary widely depending upon the reaction conditions, but is usually in the range from about 0.5 to about 10% by weight based on the weight of the aqueous solution. It is advantageous if the quantity of alkali is substantially equivalent to the hydroxy groups of the bisphenol used or the alkali is present in a slight excess. The preferred molar ratio of the alkali to the hydroxy group of the bisphenol is from 1 to 2, most preferably from 1 to 1.1.

As organic solvents which can be used for dissolving the terephthaloyl dihalide-isophthaloyl dihalide mixture, hydrocarbons or halogenated hydrocarbons are used. For example, methylene dichloride, chloroform, tetrachloromethane, 1,2-dichloroethane, 1,1,2-trichloroethane, tetrachloroethane, benzene and methylbenzene can be employed. Especially preferred are those solvents which also dissolve the aromatic co-polyesters produced. The most preferred solvent is methylene dichloride.

The reaction temperature is not strictly limited, and depends on the solvent used. For example, in the case of methylene dichloride, the reaction temperature is preferably below about 40° C, with from 5° to 30° C being especially preferred.

Interfacial polymerization is usually conducted at normal pressure and is completed in about 1 to about 20 hours.

Antioxidants, dispersing agents, catalysts and viscosity stabilizers can be added to the aqueous alkaline solution or to the reaction mixture, if desired. Typical examples of such agents are as follows. As antioxidants, sodium dithionite or sodium bisulfite can be used. As dispersing agents, anionic surface active agents such as sodium lauryl sulfate and octadecyl benzene sulfonate, cationic surface active agents such as octyl trimethyl ammonium chloride, and nonionic surface active agents such as poly(ethylene oxide) can be used. As catalysts, quaternary ammonium compounds such as trimethyl benzyl ammonium hydroxide, trimethyl benzyl ammonium chloride and triethyl benzyl ammonium chloride, tertiary sulfonium compounds such as dimethyl-2-hydroxyphenyl sulfonium chloride, quaternary phosphonium compounds such as triphenyl methyl phosphonium iodide and quaternary arsonium compounds such as triphenyl methyl arsonium iodide and trimethyl octyl arsonium iodide can be used. Tertiary ammonium compounds such as trimethyl amine, triethyl amine and benzyl dimethylamine can also be used as catalysts. As viscosity stabilizers, monovalent compounds, especially monovalent phenol compounds such as p-cumyl phenol, o-phenyl phenol, p-phenyl phenol, p-tert-butyl phenol, m-cresol and β-naphthol can be used, if desired.

Another useful method for forming the aromatic co-polyesters is melt polymerization as disclosed, for example, in A. Conix, *Ind. Eng. Chem.*, 51, 147 (1959), in Japanese Patent Publication 15,247/63 and in U.S. Pat. No. 3,395,119.

Melt polymerization can be conducted, for example, by heating and reacting an aliphatic carboxylic acid diester of bisphenol and a terephthalic acid-isophthalic acid mixture at reduced pressure. A preferred diester of the bisphenol is the diacetate. Melt polymerization can also be conducted by heating and reacting a bisphenol and a mixture of a diaryl ester of terephthalic acid and isophthalic acid. A typical diaryl ester is the diphenyl ester. The reaction temperature employed is in the range of from about 150° to about 350° C, more preferably from 180° to 320° C. The reaction pressure is usually varied during the course of the reaction from atmospheric pressure at the early part of the reaction to reduced pressure, such as below 0.02 mmHg, toward the end of the reaction.

In melt polymerization, the molar ratio of the bisphenol and the mixture of terephthalic acid-isophthalic acid components to prepare a high molecular weight aromatic co-polyester must be maintained exactly equivalent.

A number of catalysts can be used. Catalysts which are preferably used are titanium compounds, such as butyl orthotitanate and titanium dioxide. Other catalysts such as zinc oxide, lead oxide and antimony dioxide can also be used, however.

Still another method for forming the co-polyesters is solution polymerization, in which the aromatic co-polyesters are prepared by reacting a bisphenol with terephthaloyl dihalide and isophthaloyl dihalide in an organic solvent. Solution polymerizations which can be used are disclosed, for example, in A. Conix, *Ind. Eng. Chem.*, 51 147 (1959), and in U.S. Pat. No. 3,133,898.

In solution polymerization, the bisphenol and the mixture of terephthaloyl dihalide and isophthaloyl dihalide, e.g., terephthaloyl dichloride and isophthaloyl dichloride, are usually mixed in equimolar proportions in an organic solvent, and the mixture is warmed gradually to high temperatures such as about 220° C. As the organic solvent used, those solvents which also dissolve the aromatic co-polyesters produced, such as dichloroethyl benzene, are preferred. Usually, the reaction is carried out in the presence of a base to neutralize the hydrogen halide, e.g., hydrogen chloride, formed.

To add the halogen-containing aromatic co-polyester to the halogen-free aromatic co-polyester, any well known mixing technique can be used. For example, granules or powders of these two components can be mixed and blended using a V-blender, Henschel mixer, Super mixer or Kneader, and then the mixture immediately molded. Alternatively, the mixture can be formed into pellets after melting using an extruder, a Ko-kneader (manufactured by Buss Co., Ltd., Switzerland), an intensive mixer or the like, and then molded. The pelletizing or molding temperature is generally in the range of from about 250° to about 350° C, more preferably 260° to 320° C.

Another addition method comprises adding the halogen-containing aromatic co-polyester to a solution of the halogen-free aromatic co-polyester and then evaporating off the solvent. As the solvent, those solvents which dissolve the aromatic co-polyester can be used, such as methylene dichloride, tetrachloroethane and chloroform. The most preferred solvent is methylene dichloride.

The most suitable method for any particular system can be chosen depending on the composition and the desired shape and properties of the molded articles to be produced therefrom.

The flame-retardant capabilities of the flame-retardant aromatic co-polyester composition in accordance with the present invention varies depending upon the halogen content based on the total amount of the composition and upon the kind of halogen. For example, an article produced from a composition consisting of a halogen-free aromatic co-polyester comprising (a) 2,2-bis(4'-hydroxyphenyl)propane and (b) a mixture of terephthalic acid and isophthalic acid at a molar ratio of 1 : 1 and a bromine-containing aromatic co-polyester comprising (a) 2,2-bis(4'-hydroxy-3',5'-dibromophenyl)-propane and (b) a mixture of terephthalic acid and isophthalic acid at a molar ratio of 1 : 1 generally shows a rating of V-O under the UL Standard for combustion testing, as hereinafter described in detail, at a thickness of 1/16 inch when the bromine content of the composition is greater than 1% by weight based on the total weight of the composition and at a thickness of 1/32 inch when the bromine content of the composition is greater than 2% by weight based on the total weight of the composition. Also, an article produced from a composition consisting of a halogen-free aromatic co-polyester comprising (a) 2,2-bis(4'-hydroxyphenyl)propane and (b) a mixture of terephthalic acid and isophthalic acid at a molar ratio of 1 : 1 and a chlorine-containing aromatic co-polyester comprising (a) 2,2-bis(4'-hydroxy-3',5'-dichlorophenyl)propane and (b) a mixture of terephthalic acid and isophthalic acid at a molar ratio of 1 : 1 generally shows a rating of V-O under the UL Standard for combustion testing later described at a thickness of 1/16 inch when the chlorine content of the composition is greater than 1.5% by weight based on the total weight of the composition and at a thickness of 1/32 inch when the chlorine content of the composition is greater than 3% by weight based on the total weight of the composition.

Miscibility between the halogen-free aromatic co-polyester and the halogen-containing aromatic co-polyester is so good that the ratio of mixing the two copolymers can optionally be selected over a wide range.

However, generally no corresponding improvement in results is obtained if the chlorine and/or bromine content of the flame-retardant aromatic co-polyester composition in accordance with the present invention is in excess of about 70% of the theoretical amount of halogen which can be present, i.e., 47.5 wt% × ca. 70% for bromine and 28.6 wt% × ca. 70% for chlorine, based on the composition weight.

In order to improve the heat resistance, light stability, weatherability or oxidation resistance of the composition or articles according to this invention, agents preventing thermal degradation, antioxidants, ultraviolet absorbents and the like can be added thereto, if desired. For example, benzotriazole, aminophenyl benzotriazole, benzophenone, trialkyl phosphates, such as trioctyl phosphate and tributyl phosphate, trialkyl phosphites, such as trioctyl phosphite, and triaryl phosphites, such as triphenyl phosphite, can be used. These materials are conveniently added to the aromatic co-polyester composition of this invention at any time prior to molding. Known plasticizers, such as the phthalate esters, e.g., dioctyl terephthalate and dioctyl isophthalate, and colorants, such as carbon black and titanium dioxide, can also be added, if desired, in commonly used amounts as are known in this art.

The flame-retardant resin composition of this invention may contain a wide variety of polymers to produce composite compositions having various properties. Typical examples of such polymers are polyethylene terephthalates, polyethylenes, polypropylenes, polystyrenes, poly(methyl acrylates), polyacetals, polyphenylene oxides, polycarbonates, polysulfones, polyamides and the like. Also, the halogen-containing aromatic co-polyester may contain copolymers of various materials as shown above, plasticizers, thermal stabilizers, weather-resistant agents and the like which are conventionally used in resin compositions, but, in some instances, such additives may adversely affect the flame-retardant capabilities of the resin composition. In such cases, the halogen content in the composition is preferably increased. For example, a composition comprising (a) an aromatic co-polyester comprising 2,2-bis(4'-hydroxyphenyl)propane and a mixture of terephthalic acid and isophthalic acid (1 : 1 molar ratio) and (b) a halogen-containing aromatic co-polyester comprising (a) 2,2-bis(4'-hydroxy-3',5'-dibromophenyl)propane and a mixture of terephthalic acid and isophthalic acid, having incorporated therein a polyethylene terephthalate as an anti-crazing agent in an amount of 3% by weight based on the total amount of the composition preferably has a bromine content in an amount of about 3% by weight based on the total amount of the composition to ensure satisfactory flame-retardant capabilities. In the same composition as above but containing 5% by weight of polyethylene terephthalate, a preferred bromine content will be about 5% by weight based on the total amount of the composition.

The aromatic co-polyester composition of this invention can be used to form many useful articles using generally known molding methods such as injection molding, extrusion molding, press molding and the like. Typical examples of final products produced therefrom are films, monofilaments, injection molded materials such as machine parts, automobile parts, electrical parts, vessels and springs. The aromatic co-polyester composition of this invention finds special use as engineering plastics for various uses which require their excellent properties.

In the following, combustion testing of the compositions of the present invention was conducted according to Underwriters Laboratory, No. 94 (UL-94), "Combustion Test for Self-Quenching Plastics." All of the 1/32 inch thick pieces of the compositions of the present invention met the standards of V-0, V-1 and V-2. Also, they maintained the mechanical and electrical properties inherent to the aromatic co-polyesters.

The present invention will now be illustrated in more detail by the following non-limiting examples of presently preferred embodiments of the present invention. All procedures in the Examples were conducted under atmospheric pressure unless otherwise indicated.

EXAMPLE 1

1. Preparation of halogen-free aromatic co-polyester 15.2 g of terephthaloyl dichloride and 15.2 g of isophthaloyl dichloride were dissolved in 462 g of methylene dichloride, and the solution temperature was adjusted to 10° C. Separately, an alkali aqueous solution consisting of 34.2 g of bisphenol A, 0.3 g of sodium dithionite, 0.17 g of trimethyl benzyl ammonium chloride, 12.6 g of sodium hydroxide, 0.56 g of p-methoxyphenol and 750 g of water was adjusted in temperature to 15° C. The two solutions were mixed with each other while stirring, and stirring was continued for 3 hours at room temperature. Upon discontinuing the stirring and allowing the system to stand, a methylene dichloride phase dissolving the resulting polymer separated. This methylene dichloride phase was washed several times with pure water and then poured into acetone in a volume proportion of 1 : 1 to precipitate the polymer. The polymer precipitated was then dried. The logarithmic viscosity number thereof measured in a phenol-tetrachloroethane mixed solvent (6 : 4 by weight) was 0.65 at 25° C.

This powder was formed into chips and injection molded. As a result of combustion testing according to UL No. 94, a ⅛ inch thick sample piece, a 1/16 inch thick sample piece and 1/32 inch thick sample piece showed fire retardant standards of V-0, V-1 and V-1, respectively. The tensile strength, elongation at break, tensile impact strength and arc resistance of the polymers were 750 kg/cm$^2$, 70%, 600 kg·cm/cm$^2$ and 130 seconds, respectively. 2. Preparation of halogen-containing aromatic co-polyester 8.2 g of sodium hydroxide was dissolved in 460 ml of water, and, subsequently, 54.4 g of 2,2-bis(4'-hydroxy-3',5'-dibromophenyl)propane and 0.27 g of trimethyl benzyl ammonium chloride were dissolved therein. To this solution (at 15° C) was added a solution (at 15° C) prepared by dissolving 10.1 g of isophthalic acid chloride and 10.1 g of terephthalic acid chloride in 230 cc of methylene dichloride, and the system vigorously stirred. Immediately after initiating stirring, the mixture became emulsified. After 2 hours, the stirring was discontinued at 20° C, and the aqueous phase removed by adding 10 ml of a 0.1N aqueous hydrochloric acid solution to the mixture while stirring at room temperature followed by allowing the resulting mixture to stand. The methylene dichloride layer was then washed with water and the washed methylene dichloride layer was poured into hot water having a temperature of about 60° to 100° C to isolate the polymer. The resulting polymer had a logarithmic viscosity number of 0.45 (solvent: phenol/tetrachloroethane = 6/4 by weight; at 25° C), and the pyrolysis-initiating point (TGA; temperature elevation rate: 20° C/min) was 400° C.

The results of combustion testing according to the earlier mentioned UL standard on samples prepared by extrusion mixing the resulting bromine-containing aromatic co-polyester with the halogen-free aromatic co-polyester in various proportions, tensile strength, elongation at break and tensile impact strength are tabulated in Table 1.

TABLE 1

| No. | Compounding Proportion (wt%) Aromatic Co-polyester | Compounding Proportion (wt%) Bromine-containing Co-polyester | Bromine Content of the Composition (wt %) | Combustion Test 1/16 inch Rating | Combustion Test 1/32 inch Rating | Tests on Physical Properties Tensile Yield Strength (kg/cm$^2$) | Tests on Physical Properties Elongation at Break (%) | Tests on Physical Properties Tensile Impact Strength (kg.cm/cm$^2$) |
|---|---|---|---|---|---|---|---|---|
| 1 | 100 | 0 | 0 | V-1 | V-1 | 750 | 70 | 600 |
| 2 | 99 | 1 | 0.47 | V-1 | V-1 | 770 | 70 | 605 |
| 3 | 97.5 | 2.5 | 1.2 | V-0 | V-1 | 760 | 70 | 590 |
| 4 | 95 | 5 | 2.4 | V-0 | V-0 | 750 | 65 | 570 |
| 5 | 90 | 10 | 4.8 | V-0 | V-0 | 740 | 64 | 560 |
| 6 | 85 | 15 | 7.2 | V-0 | V-0 | 735 | 63 | 540 |
| 7 | 80 | 20 | 9.6 | V-0 | V-0 | 740 | 60 | 520 |

TABLE 1-continued

| No. | Compounding Proportion (wt%) Aromatic Co-polyester | Compounding Proportion (wt%) Bromine-containing Co-polyester | Bromine Content of the Composition (wt %) | Combustion Test 1/16 inch Rating | Combustion Test 1/32 inch Rating | Tensile Yield Strength (kg/cm²) | Elongation at Break (%) | Tensile Impact Strength (kg.cm/cm²) |
|---|---|---|---|---|---|---|---|---|
| 8 | 75 | 25 | 11.8 | V-0 | V-0 | 700 | 50 | 500 |

The results of combustion testing show that when the bromine content was not less than 1% by weight, the samples met the standards of V-0 and V-1 (with a 1/16 inch thick sample and a 1/32 inch thick sample, respectively), and that the addition of the bromine-containing co-polyester in a proportion of 25% by weight did not cause deterioration of other physical properties.

EXAMPLE 2

82 g of sodium hydroxide and 1.8 g of sodium dithionite were dissolved in 4.6 liters of water and, subsequently, 364 g (1 mol) of 2,2-bis(4'-hydroxy-3',5'-dichlorophenyl)propane and 2.7 g of trimethyl benzyl ammonium chloride were dissolved therein, followed by adjusting the solution temperature to 10° C. Separately, 202 g (1 mol) of an acid dichloride mixture of terephthaloyl dichloride/isophthaloyl dichloride (5 : 5 molar ratio) was dissolved in 2.3 liters of methylene dichloride and, subsequently, 6.3 g of 2-phenyl-2-(4'-hydroxyphenyl)propane was dissolved therein, followed by adjusting the solution temperature to 10° C. The methylene dichloride solution was gradually added over a period of about 1 to 5 minutes to the aqueous layer while stirring the aqueous layer, and reaction was conducted for 2 hours at room temperature. After the completion of the reaction, the aqueous layer and the organic layer were separated from each other after allowing the reaction mixture to stand and the methylene dichloride layer washed with water. After removing insolubles by filtering the methylene dichloride solution, it was poured into acetone to isolate the polymer. The polymer had a logarithmic viscosity number of 0.47 (solvent: phenol/tetrachloroethane = 6/4 by weight; at 25° C) and had a pyrolysisinitiation point (TGA; temperature elevation rate: 20° C/min) of 420° C.

This chlorine-containing aromatic co-polyester was mixed with a halogen-free aromatic co-polyester prepared as in Example 1, subjected to pelletizing at 300° C by an extruder and formed into sample pieces by injection molding. Combustion testing and measurement of other physical properties were conducted using the resulting sample pieces. The results are tabulated in Table 2.

TABLE 2

| No. | Compounding Proportion (wt%) Aromatic Co-polyester | Compounding Proportion (wt%) Chlorine-containing Co-polyester | Chlorine Content of the Composition (wt %) | Combustion Test 1/16 inch Rating | Combustion Test 1/32 inch Rating | Tensile Yield Strength (kg/cm²) | Elongation at Break (%) | Tensile Impact Strength (kg.cm/cm²) |
|---|---|---|---|---|---|---|---|---|
| 1 | 100 | 0 | 0 | V-1 | V-1 | 760 | 70 | 650 |
| 2 | 94 | 6 | 1.7 | V-0 | V-1 | 750 | 65 | 600 |
| 3 | 90 | 10 | 2.9 | V-0 | V-1 | 750 | 65 | 600 |
| 4 | 80 | 20 | 5.7 | V-0 | V-0 | 740 | 65 | 600 |

As is shown in Table 2, flame-retardant capability was improved to the level of V-0 by a 3% by weight chlorine content of the composition without deteriorating other physical properties.

EXAMPLE 3

522.4 g of sodium hydroxide was dissolved in 30 liters of water, and, subsequently, 1469.3 g of 2,2-bis(4'-hydroxy-3',5'-dibromophenyl)propane, 620.4 g of 2,2-bis(4'-hydroxyphenyl)propane, 6.5 g of sodium dithionite and 6.1 g of trimethylbenzyl ammonium chloride were dissolved therein, followed by adjusting the system temperature to 10° C.

Subsequently, 552.3 g of terephthalic acid chloride, 552.3 g of isophthalic acid chloride and 43.6 g of 2-phenyl-2-(4'-hydroxyphenyl)propane were dissolved in 15 liters of methylene dichloride, and the solution temperature was maintained at 10° C. The two solutions were mixed while stirring, and stirring was continued for 3 hours at room temperature, whereafter stirring was discontinued, the aqueous phase removed after allowing the mixture to stand and the methylene dichloride phase washed 3 times with pure water. Thereafter, methylene dichloride was removed under heating and stirring with a kneader to obtain a copolymer.

This polymer had the logarithmic viscosity number (solvent: phenol/tetrachloroethane = 6/4 by weight; at 25° C) of 0.60, and the pyrolysis-initiating point (TGA; temperature elevation rate: 20° C/min) was 400° C.

The thus obtained bromine-containing aromatic co-polyester was mixed, in various proportions, with the halogenfree aromatic co-polyester prepared as described in Example 1. The results of combustion testing on the samples prepared therefrom according to the earlier identified UL standard, and mechanical and electrical properties are tabulated in Table 3.

TABLE 3

| No. | Compounding Proportion (wt%) Aromatic Co-polyester | Compounding Proportion (wt%) Bromine-containing Co-polyester | Bromine Content of the Composition (wt. %) | Combustion Test 1/16 inch Rating | Combustion Test 1/32 inch Rating | *1 | *2 | *3 | *4 |
|---|---|---|---|---|---|---|---|---|---|
| 1 | 100 | 0 | 0 | V-1 | V-1 | 750 | 70 | 600 | 130 |

TABLE 3-continued

| | Compounding Proportion (wt%) | | Bromine Content of the Composition (wt. %) | Combustion Test | | Tests on Physical Properties | | | |
|---|---|---|---|---|---|---|---|---|---|
| No. | Aromatic Co-polyester | Bromine-containing Co-polyester | | 1/16 inch Rating | 1/32 inch Rating | *1 | *2 | *3 | *4 |
| 2 | 97 | 3 | 0.93 | V-1 | V-1 | 750 | 70 | 600 | 130 |
| 3 | 94 | 6 | 1.9 | V-0 | V-1 | 720 | 68 | 595 | 128 |
| 4 | 90 | 10 | 3.1 | V-0 | V-0 | 720 | 67 | 560 | 124 |
| 5 | 80 | 20 | 6.2 | V-0 | V-0 | 710 | 65 | 550 | 120 |
| 6 | 70 | 30 | 9.3 | V-0 | V-0 | 710 | 60 | 550 | 117 |
| 7 | 50 | 50 | 15.5 | V-0 | V-0 | 690 | 50 | 550 | 100 |

*1 Tensile Yield Strength (kg/cm$^2$)
*2 Elongation at Break(%)
*3 Tensile Impact Strength (kg.cm/cm$^2$)
*4 Arc Resistance (sec)

As is shown in Table 3, a 3% by weight bromine content of the composition enabled the sample to meet the standard of V-0 and, with increased content of the bromine-containing aromatic co-polyester, the sample became incombustible. No deterioration of other physical properties was observed.

EXAMPLE 4

84 g of sodium hydroxide and 1.8 g of sodium dithionite were dissolved in 4.6 liters of pure water, and, subsequently, 36.6 g of 2,2-bis(4'hydroxy-3', 5'-dichlorophenyl)propane, 205 g of 2,2-bis(4'-hydroxyphenyl)propane, 2.7 g of trimethyl benzyl ammonium chloride and 3.7 g of p-methoxyphenol were dissolved therein, followed by adjusting the solution temperature to 15° C.

Separately, 202 g of an acid mixture of terephthaloyl dichloride/isophthaloyl dichloride (5:5 molar ratio) was dissolved in 2.3 liters of methylene dichloride, and the solution temperature adjusted to 10° C.

The methylene dichloride solution was gradually added to the aqueous phase while stirring, and the stirring at 20° C was continued for 2 hours. Stirring was discontinued, and the aqueous phase and the methylene dichloride phase separated from each other after allowing the mixture to stand. The methylene dichloride phase was washed 4 times with water and, after filtration, the solution was poured into acetone to obtain a chlorine-containing aromatic co-polyester.

This copolymer had a logarithmic viscosity number of 0.60 (solvent: phenol/tetrachloroethane = 6/4 by weight; at 25° C) and the pyrolysis- initiation point (TGA; temperature elevation rate: 20° C/min) was 450° C.

This chlorine-containing aromatic co-polyester was mixed, in various proportions, with the halogen-free aromatic co-polyester prepared as described in Example 1, pelletized at 300° C by an extruder, and formed into test pieces by injection molding, which pieces were then subjected to combustion testing and to testing for measuring other physical properties. The results obtained are tabulated in Table 4.

TABLE 4

| | Compounding Proportion (wt%) | | Chlorine Content of the Composition (wt%) | Combustion Test | | Tests on Physical Properties | | | |
|---|---|---|---|---|---|---|---|---|---|
| No. | Aromatic Co-polyester | Chlorine-containing Co-polyester | | 1/16 inch Rating | 1/32 inch Rating | *1 | *2 | *3 | *4 |
| 1 | 100 | 0 | 0 | V-1 | V-1 | 750 | 70 | 600 | 130 |
| 2 | 90 | 10 | 0.38 | V-1 | V-1 | 750 | 70 | 600 | 130 |
| 3 | 73 | 27 | 1.03 | V-1 | V-1 | 750 | 70 | 600 | 130 |
| 4 | 50 | 50 | 1.9 | V-0 | V-1 | 730 | 69 | 600 | 129 |
| 5 | 30 | 70 | 2.7 | V-0 | V-1 | 720 | 65 | 590 | 125 |
| 6 | 10 | 90 | 3.4 | V-0 | V-0 | 700 | 60 | 580 | 125 |

*1 Tensile Yield Strength (kg/cm$^2$)
*2 Elongation at Break (%)
*3 Tensile Impact Strength (kg.cm/cm$^2$)
*4 Arc Resistance (sec)

As is shown in Table 4, a 3.4% by weight chlorine content of the composition permitted the 1/16 inch thick sample and the 1/32 inch thick sample to meet the standard of V-0 in flame-retardant capability.

In addition, with increased amounts of the chlorine-containing co-polyester, the samples met the standard of V-0 and became incombustible. No deterioration in physical properties was observed.

EXAMPLE 5

The halogen-free aromatic co-polyester prepared described in Example 1, the bromine-containing aromatic co-polyester prepared as described in Example 1 and polyethylene terephthalate having a relative viscosity ($\eta$ rel) of 1.38 at 25° C at a concentration of 1 g/100 ml in phenol/tetrachloroethane (6/4 by weight) were mixed in various proportions as indicated in Table 5 below, and the resulting samples were subjected to the combustion testing according to the earlier mentioned UL standard. The results obtained are also shown in Table 5 below.

TABLE 5

| No. | Compounding Proportion (wt%) | | | Bromine content of the composition (wt%) | Combustion Test | |
|---|---|---|---|---|---|---|
| | Aromatic Co-polyester | Bromine containing Co-polyester | Polyethylene terephtalate | | 1/16 inch Rating | 1/32 inch Rating |
| 1 | 97 | 0 | 3 | 0 | V-1 | V-2 |
| 2 | 90.5 | 6.5 | 3 | 3.1 | V-0 | V-1 |
| 3 | 85 | 12 | 3 | 5.7 | V-0 | V-0 |
| 4 | 95 | 0 | 5 | 0 | V-2 | V-2 |
| 5 | 88 | 7 | 5 | 3.3 | V-1 | V-1 |
| 6 | 84 | 11 | 5 | 5.2 | V-0 | V-0 |

The above test results clearly indicate that the flame-retardant capabilities of the samples can be markedly improved when the samples contain bromine in approximately the same amount (weight) as that of polyethylene terephthalate.

While the invention has been described in detail and with reference to specific embodiments thereof, it will be apparent to one skilled in the art that various changes and modifications can be made therein without departing from the spirit and scope thereof.

What is claimed is:

1. A flame-retardant aromatic co-polyester composition comprising (A) a halogen-free aromatic co-polyester obtained by the condensation reaction of (a) 2,2-bis(4'-hydroxyphenyl)propane and (b) a mixture of isophthalic acid and/or its functional derivatives and terephthalic acid and/or its functional derivatives, and (B) a halogen-containing aromatic co-polyester obtained by the condensation reaction of (a) 2,2-bis(4'hydroxy-3', 5'-dibromophenyl)propane and/or 2,2-bis(4'-hydroxy-3', 5'-dichlorophenyl)propane and (b) a mixture of isophthalic acid and/or its functional derivatives and terephthalic acid and/or its functional derivatives.

2. The flame-retardant aromatic co-polyester composition as described in claim 1, wherein the molar ratio of terephthalic acid to isophthalic acid is about 1:9 to about 9:1.

3. The flame-retardant aromatic co-polyester composition as described in claim 1, wherein the molar ratio of terephthalic acid to isophthalic acid is 3 : 7 to 7 : 3.

4. The flame-retardant aromatic co-polyester composition as described in claim 1, wherein the molar ratio of terephthalic acid to isophthalic acid is 1 : 1.

5. The flame-retardant aromatic co-polyester composition as described in claim 1, wherein the halogen content based on the total amount of the composition is at least about 1% by weight.

6. The flame-retardent aromatic co-polyester composition as described in claim 5, wherein the halogen is bromine.

7. The flame-retardant aromatic co-polyester composition as described in claim 1, wherein the halogen content based on the total amount of the composition is at least about 1.5% by weight.

8. The flame-retardant aromatic co-polyester composition as described in claim 7, wherein the halogen is chlorine.

9. The flame-retardant aromatic co-polyester composition as described in claim 1, wherein the halogen content based on the total amount of the composition is at least about 2.0% by weight.

10. The flame-retardant aromatic co-polyester composition as described in claim 1, wherein the halogen content based on the total amount of the composition is at least 3.0% by weight.

11. A molded article produced from the composition of claim 1.

* * * * *